No. 787,951. PATENTED APR. 25, 1905.
W. SIM.
MILKING MACHINE.
APPLICATION FILED JULY 14, 1903.

3 SHEETS—SHEET 1.

WITNESSES
INVENTOR
William Sim
By Richards
ATTORNEYS

No. 787,951. PATENTED APR. 25, 1905.
W. SIM.
MILKING MACHINE.
APPLICATION FILED JULY 14, 1903.
3 SHEETS—SHEET 2.
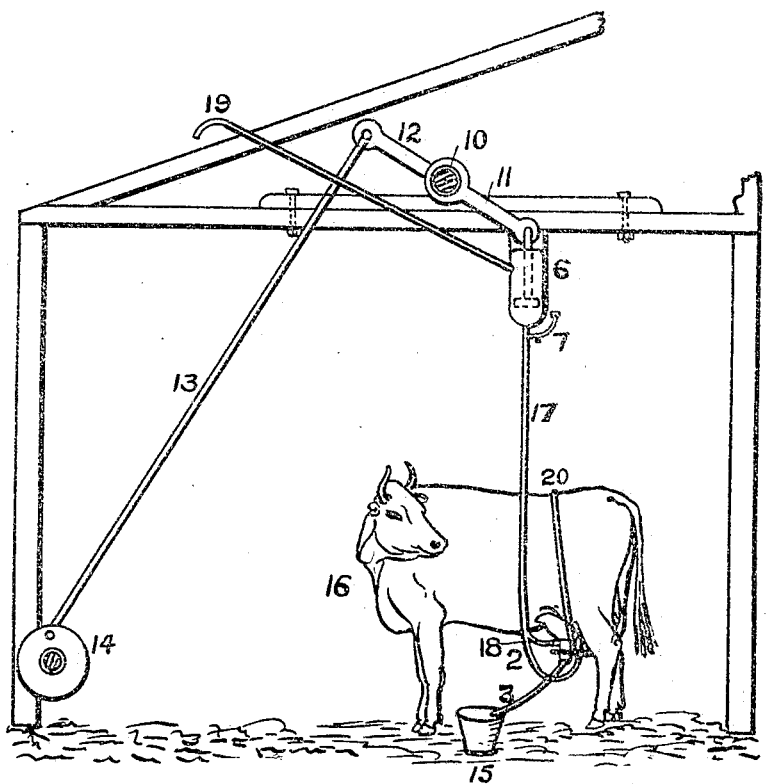
FIG. 6.
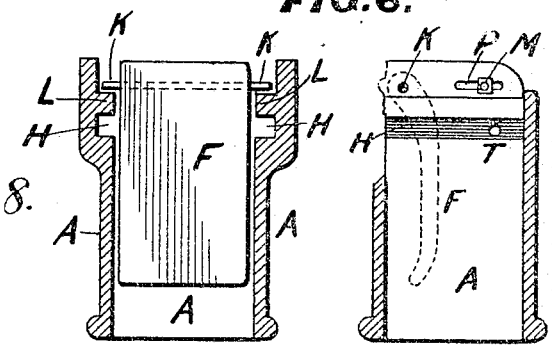
FIG. 8. FIG. 9.
WITNESSES
INVENTOR
William Sim
FIG. 10.
ATTORNEYS No. 787,951. PATENTED APR. 25, 1905.
W. SIM.
MILKING MACHINE.
APPLICATION FILED JULY 14, 1903.

3 SHEETS—SHEET 3.

No. 787,951. Patented April 25, 1905.

UNITED STATES PATENT OFFICE.

WILLIAM SIM, OF UNDERWOOD, NEW ZEALAND.

MILKING-MACHINE.

SPECIFICATION forming part of Letters Patent No. 787,951, dated April 25, 1905.

Application filed July 14, 1903. Serial No. 165,438.

*To all whom it may concern:*

Be it known that I, WILLIAM SIM, engineer, of Underwood, Invercargill, New Zealand, have invented certain Improvements in Milking-Machines, of which the following is a specification.

The object of my invention is to provide an apparatus for milking cows that have ordinary well-formed udders and teats, which will not hurt the cows by its continuous operation even after all the milk has been drawn from the udder, which can be easily cleansed, and which prevents dirt or the like from reaching the milk, and which shall keep the milk clean.

The leading feature of the invention is the arrangement hereinafter described which imitates the action of the hand when milking.

The invention consists of the arrangement before referred to and of the combination and arrangement of parts hereinafter described, and more particularly pointed out in the claims.

Figure 1:
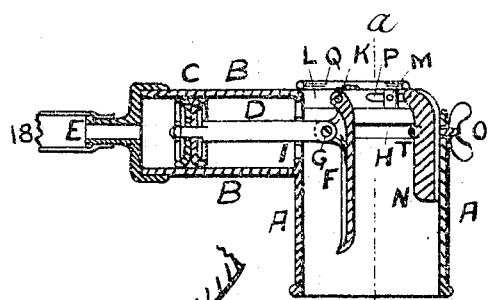
Figure 2:
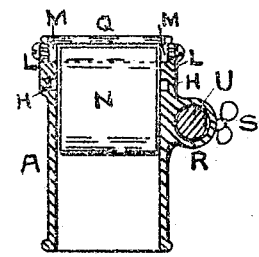
Figure 5:
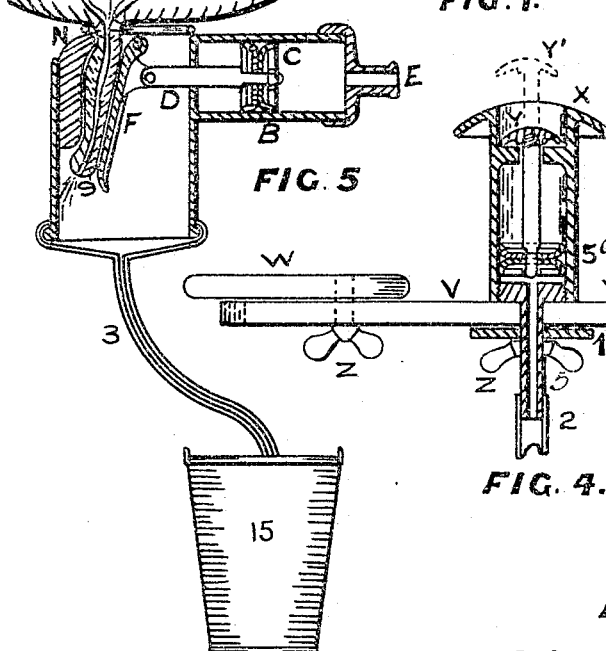
Figure 4:
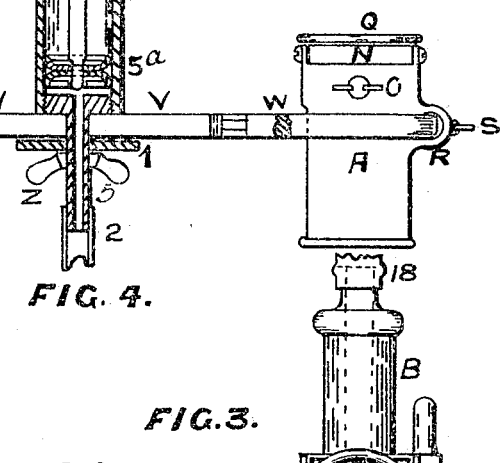
Figure 3:
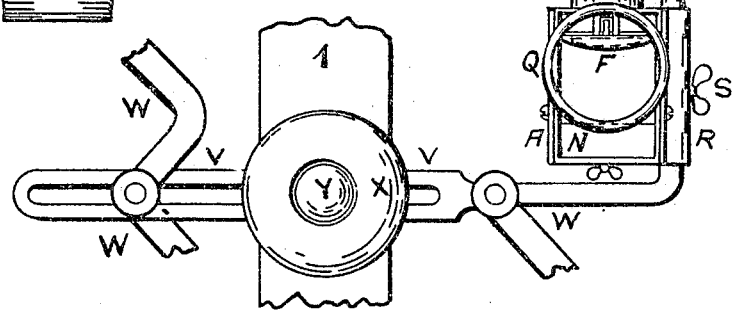
Figure 7:
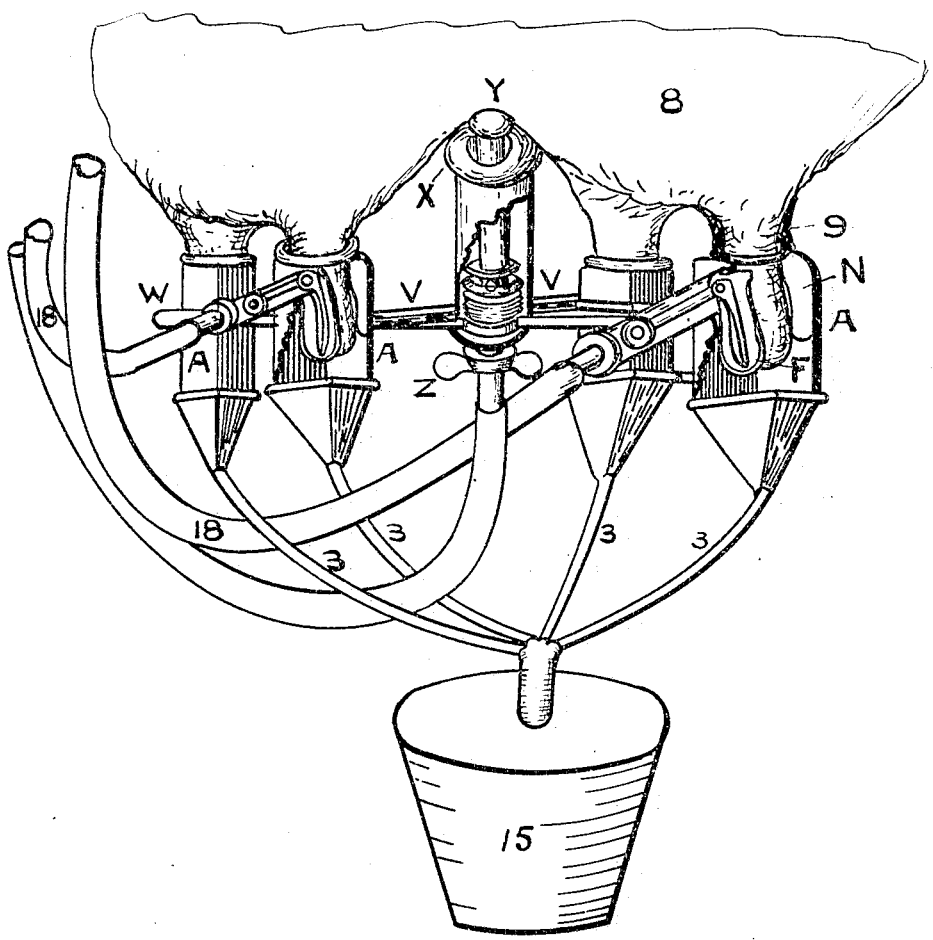

In the drawings, Figure 1 is a longitudinal section through part of the machine, illustrating what is called the "milker" and comprising an air-inlet, cylinder, and piston, a tube, and the arrangement in the tube which imitates the action of the hand. Fig. 2 is a cross-section through *a b*, Fig. 1. Fig. 3 shows a plan of the holder, arms, udder shaker or bumper, and one milker attached to an arm. Fig. 4 shows a section through the cylinder in which the bumper works and also an elevation of the holder and milker. Fig. 5 shows the milker applied to a teat with milk being forced from the teat by pressure between the tongue and the pad and also the tube conveying the milk to a bucket. Fig. 6 is a general view of the machine secured in position to a cow. Fig. 7 is a perspective view with parts broken away. Fig. 8 is a section across the cup parallel with the pin K. Fig. 9 is a section across the cup at right angles with the pin K. Fig. 10 is a horizontal section of the lower part of the tongue to show the convex or crowned shape.

A is a tube.

B is a cylinder secured to the tube.

C is the piston driven by compressed air through the inlet E and pushing the piston-rod D, pivotally secured to the tongue F by the pin G. The tongue F is slightly crowned from all sides to fit the teat, which is thicker on the outer edges than in the middle when pressed, all edges being slightly curved backward to prevent any chance of pinching or nipping the teat. In other words, the surface of the tongue which is to bear against the teat is practically concave, as shown in Fig. 10. The pin G is slightly longer than the width of the tube A and is adapted to slide backward and forward in the grooves H H, one groove being on each side of the tube A, the pin G thereby acting as a guide to the piston-rod D and tongue F. In the backward stroke the pin G also acts as a stop against the bridge I.

I is a bridge at the end of the cylinder B to prevent the piston-rod D working sidewise.

K is also a pin secured to the upper part of the tongue F. The ends of the pin K are above the top of the tube A and extend nearly to the inside of the shouldered part L of the tube A. This shouldered part L acts as an end guide to the pin K. The ends of the pin K act as a stop against the adjustable stops M M. These stops M M are used in adjusting the distance which the upper part of the tongue F can travel, so as to avoid too much pressure on the neck of the teat, seeing that the neck of the teat is softer than any other part thereof. The stops M M are adjustable in grooves P. The lower part of the tongue is forced farther forward by the action of the piston C during the remaining part of its stroke, as shown in Fig. 5. The backward stroke of the plunger of the pump 6, Fig. 6, causes a suction releasing all pressure, and the piston returns to its original position near the inlet E. This allows the teat to refill with milk from the udder, ready for the repeated action of the tongue F until the cow is milked dry.

A rubber pad N, attached to a suitable holder, is secured to the tube A by means of a wing-nut O. Different lengths of pads are necessary where there is a considerable variation in the length of the teats, the pad being preferably three-eighths to half an inch shorter than the teat operated upon. The top part of the pad N is curved forward similar to the curve of the upper part of the tongue F, so as to cause a slight doubling at the neck of the teat to prevent the milk from passing back into the udder. The lower part of the pad N is rounded off to prevent the end of the passage in the teat being closed by the pressure of the tongue, and the whole pad N is also adapted, as shown, to prevent undue pressure on the teat.

Q is a ring for guiding the teat into the tube A and it may hold a rubber sheath that may be used on the teat when it is sore or warty. This ring Q may be fixed to the top of the pad N and to one side of the tube A, or it may be made detachable.

R is a lug attached to the tube A and bored to receive the arm W of the holder V for the purpose of adjusting the tube A so that the tongues and pads may fit on the teats. This arm W is secured to the lug R by a wing-nut S. A cylinder 5ª is secured to the slotted holder V by the wing-nut Z. This cylinder has a dome-shaped flange X at its upper end, through which the bumper Y is moved upward and downward by means of the air-pump operating through the detachable tube 2 on the piston 5, as already described for the piston C, Fig. 1. Thus at every stroke of the piston the udder gets a bump or shake. This bumper can be used during the whole process of milking or can be turned off at will. This dome-shaped flange X is used to support the center of the udder between the teats.

A cross-bar 1 has straps 20 fixed to it for securing the milker to the cow.

Fig. 6 illustrates the invention in operation, in which 3 is a tube conveying the milk to a bucket 15. 6 is the air-pump. 7 is a safety-valve provided at each terminal between each two cows to regulate the pressure of the pistons 5 and C. 10 is a rocking shaft carrying a beam, of which 11 is an arm working the piston of the air-pump, and 12 is an arm connecting the rocking shaft with the driving power 14 by a rod 13. 17 is the main lead conveying air from the pump to the milker and bumper. 18 is a branch tube of the main lead 17 from the main lead to the milker. 19 is an air-inlet carried to the outside of the building to insure fresh air being supplied to the pump, if required.

To operate the invention, the stops M M are adjusted to prevent undue pressure on the neck of the teat. The holder V is then secured by means of straps 20 to the animal, as shown in Fig. 6, and the milkers are then adjusted along the arms W of the holder V to the position of the teats, care being taken that the right-sized rubber pad has been inserted in the milker. Then the arms W are adjusted to the required angles and positions of the teats. The teats are then inserted through the ring Q at the top of the tube A. The air-tubes are then connected.

The driving power is an ordinary air-pump 6 without valves, excepting a vacuum-valve to keep the working chamber filled with air, should any leakage occur. Assuming all the mechanism to be perfect, no fresh supply of air is required for the inward stroke, the air in the pump and tubes being merely compressed from same into the milker-cylinders on the inward stroke and drawn out (or allowed to expand) on the backward stroke into the working chamber of pump again for the next inward stroke; but as a certain amount of air will probably escape through the parts wearing, provision is made to supply fresh air by means of the pipe 19 into the working chamber at the commencement of the inward stroke. Then the inward stroke compresses the air, forcing the piston C forward, giving the necessary squeeze to the teat. The outward stroke creates a partial vacuum, and thereby draws the tongue back, releasing the pressure off the teat, permitting the teat to resume its normal condition.

Once the machine is adjusted no further adjustment should be required during the milking season, as each machine can be distinguished by a number or name for each cow.

Having now described my invention, what I claim as new, and desire to secure by Letters Patent, is—

1. A milking-machine consisting of a tube, a pad secured therein, a tongue suspended in said tube opposite said pad, means for securing said tube to a teat, and means for operating said tongue substantially as described.

2. A milking-machine consisting of a tube, a pad secured therein, said pad having its upper part curved forward and its lower part rounded off a tongue opposite said pad provided with a pin at its upper end guides in said tube for said pin means for securing said tube to a teat and means for operating said tongue substantially as described.

3. A milking-machine consisting of a tube, a pad secured therein, said pad having its upper part curved forward and its lower part rounded off a tongue opposite said pad slightly crowned from all sides with its edges slightly curved backward a pin at the upper end of said tongue, guides in said tube for said pin means for securing said tube to a teat, and means for operating said tongue substantially as described.

4. A milking-machine consisting of a tube, a pad secured therein, said pad having its upper part curved forward and its lower part rounded off, a tongue opposite said pad slightly crowned from all sides with its edges slightly curved backward, a pin at the upper end of said tongue, guides in said tube for said pin, a rod pivotally secured to said tongue by a second pin slightly longer than the width of said tube, grooves on each side of said tube for said second pin, means for securing said tube to a teat and means for actuating said rod substantially as described.

5. A milking-machine consisting of a tube, a pad secured therein, a tongue opposite said pad provided with a pin at its upper end, guides in said tube for said pin, means for operating said tongue, means for securing said tube to a teat, and means for periodically bumping the udder substantially as described.

6. A milking-machine consisting of a slotted holder, bumper mechanism adjustably secured thereto, bent arms secured to said holder, a milker secured to the end of each arm, means for securing said slotted holder to a cow and a milker to each teat, and mechanism actuating said bumper and milkers substantially as described.

7. In a milking-machine the bumper mechanism consisting of a cylinder secured to a slotted holder, a dome-shaped flange at the upper end of said cylinder, an aperture in said upper end, a piston-rod carrying a bumper at its upper end, means for securing said bumper mechanism to a cow, and means for operating said piston-rod substantially as and for the purposes set forth.

In witness whereof I have hereunto set my hand in presence of two witnesses.

WILLIAM SIM.

Witnesses:
   CHAS. H. ROBERTS,
   T. W. BUXTON.